UNITED STATES PATENT OFFICE.

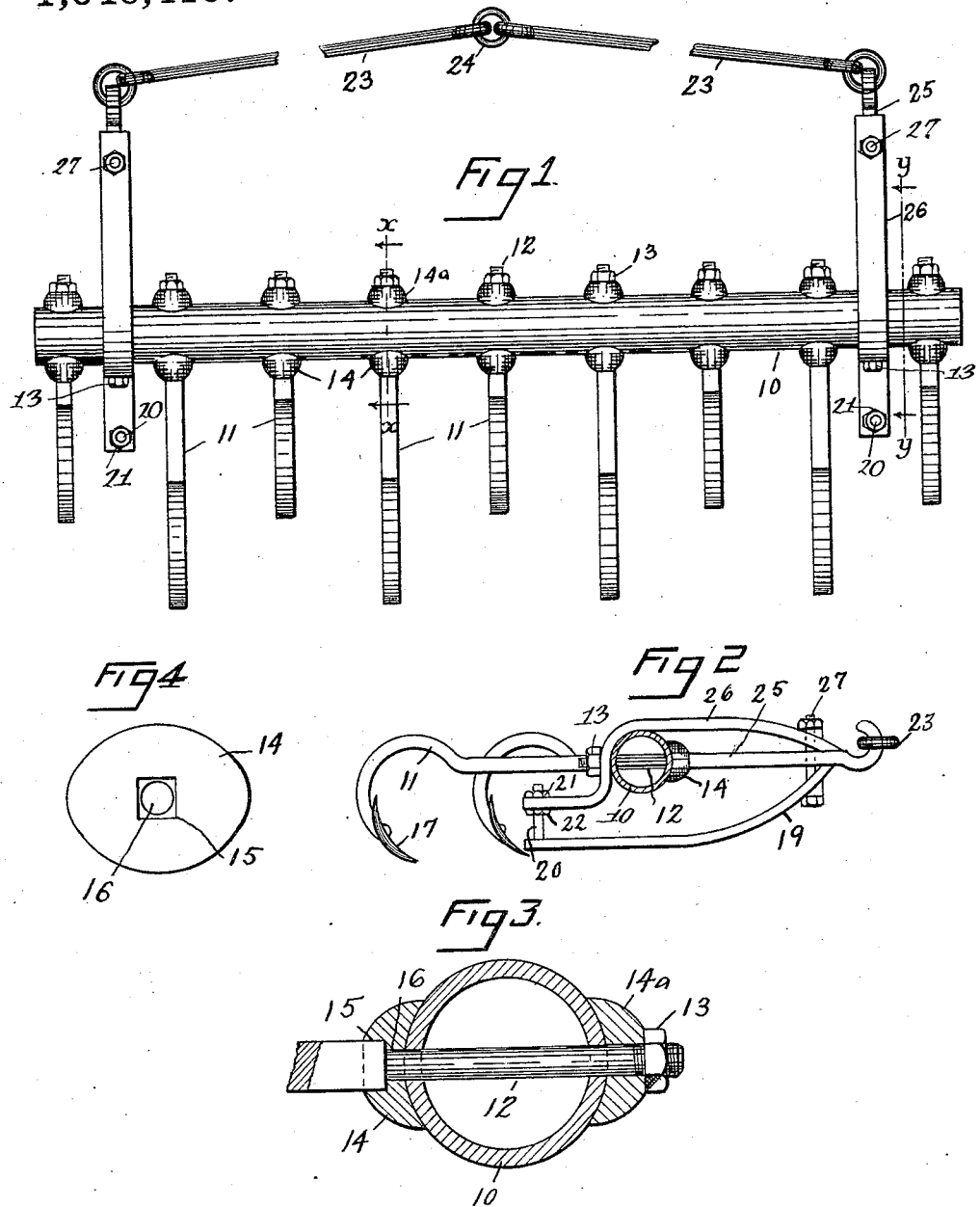

JOHN C. WILLIAMS, OF ORANGE, CALIFORNIA.

CULTIVATOR.

1,046,419.
Specification of Letters Patent.
Patented Dec. 3, 1912.

Application filed October 10, 1911. Serial No. 653,838.

*To all whom it may concern:*

Be it known that I, JOHN C. WILLIAMS, a citizen of the United States, residing at Orange, California, have invented a new and useful Cultivator, of which the following is a specification.

My invention relates to an improvement in a cultivator designed and used to loosen and level soil and to break up clods.

The object of the invention is to provide a cheap and efficient cultivator, one which is durable and not easily damaged.

The construction by means of which I attain these results is shown in the accompanying drawings, in which—

Figure 1 is a top plan view of a complete cultivator. Fig. 2 is a sectional view taken at y—y in Fig. 1. Fig. 3 is a fragmental section taken at x—x in Fig. 1. Fig. 4 is a plan view of a washer.

Throughout the several views like characters refer to like parts.

Referring to the details of construction, 10 is a tubular head usually consisting of a piece of ordinary steel pipe.

11 indicates the part usually designated as the "goose neck." The goose neck consists of a bar of metal, iron or steel, rectangular in cross section except where the round shank 12 is formed at the upper end. The outer end of this shank 12 is threaded to receive a nut 13.

14 is a saddle washer the inside surface of which is concaved to fit the surface of the head 10. A rectangular recess 15 is formed in the outer side of said washer of a size and shape corresponding to the cross section of the goose neck. A circular opening 16 in the center of this recess, of equal diameter to the shank 12, extends from the bottom of the recess 15 to the inside of the washer. The washer 14 in use fits over the goose neck at the point where the round shank joins the square portion. When the shank 12 is passed through the pipe head and secured in place by means of the nut 13 pressing against a washer 14$^a$, the washer 14 effectually prevents the goose neck from turning and twisting.

17 indicates ordinary cultivator teeth attached to the lower ends of the goose necks. Any number of goose necks may be provided and they are usually made of two lengths and the different lengths alternately placed.

25 refers to the draw bars, rectangular in shape, with a round shank similar to that on each goose neck. The draw bars are each provided with a saddle washer 14 and are fastened to the head in the same manner as each goose neck. Draw irons 23 are fastened in hooks in ends of the draw bars 25.

26 is a top bar the front end of which is attached to the draw bar by means of the bolt 27. The top bar 26 passes over the head 10 and down around the back under the nut 13 on the end of the draw bar taking the place of the washer 14$^a$ used in other places under the nut. From this nut the bar 26 extends horizontally a short distance.

19 is a runner fastened by the bolt 27 to to draw iron. An adjusting bolt 20 is attached to the back end of the runner 19. The upper end of this bolt is threaded and is passed through an aperture in the end of the bar 26. By means of adjusting nuts 21 and 22 the runner may be drawn upward or pushed downward from the head. The depth at which the teeth are allowed to enter the ground is regulated by adjusting the runner as above.

In use a team is hitched to the ring 24. As the cultivator is drawn over ground the cultivator teeth loosen up the soil, the depth being regulated by the adjustment of the bolt 20.

This cultivator is low and with the round head is especially adapted for use as a fruit cultivator where a higher and more complicated machine could not be used.

This invention is an improvement of the device for which Letters Patent of the United States, No. 928,487, were issued to me and Howard O. Williams on the 20th day of July, 1909.

Having thus described my invention, what I claim as new and desire to secure by Letters Patent is:—

1. In a cultivator: a tubular head; a series of rectangular goose necks 11 having round shanks passing through said head; washers 14 having concaved inner surfaces adapted to fit against the head and having rectangular recesses adapted to engage the goose necks at the junction of the rectangular and round portions; similar washers on the opposite side of said head, each having a round opening to receive a shank on a goose neck; a nut threaded on the end of each shank; draw bars attached to said head; and draw irons attached to said draw bars, all as described.

2. In a cultivator: a tubular head 10; a series of rectangular goose necks 11 having round shanks passing through said head; washers 14 having concaved inner surfaces and each having a rectangular recess adapted to engage the end of the goose neck at the junction of the rectangular and round portions; a nut threaded on the shank formed on the end of the goose neck; a draw bar attached to said head; an adjustable shoe attached to said draw bar; and draw irons attached to said draw bar, all as described.

3. In a cultivator: a tubular head 10; a series of rectangular goose necks; a round shank 12 formed on the upper end of each goose neck passing through said head and threaded on the outer end; a washer 14 having a rectangular recess adapted to receive and engage the goose neck at the junction of the rectangular and round portions, the inner surface of said washer being concaved to fit against said head; a nut threaded on the outer end of said shank 12; a concaved washer between said nut and said head; a draw bar fastened to said head; runners fastened to the said draw bar; threaded adjusting bolts passing through the ends of said runners and through a top bar; said top bar; nuts on said adjusting bolts; and draw irons attached to said draw bar, all as described.

JOHN C. WILLIAMS.

Witnesses:
ANDREW K. MARTELL,
HANNA MENDENHALL.

Copies of this patent may be obtained for five cents each, by addressing the "Commissioner of Patents, Washington, D. C."